(12) United States Patent
Stanek et al.

(10) Patent No.: US 7,105,631 B2
(45) Date of Patent: Sep. 12, 2006

(54) PREPARATION OF ALKYLATED N- OR AMINO, AMMONIUM OR SPIROBICYCLIC AMMONIUM GROUP-CONTAINING, CROSSLINKED POLYMERS

(75) Inventors: Michael Stanek, Linz (AT); Marion Wagner, Katsdorf (AT); Gerhard Schoppel, Steinhaus b. Wels (AT); Georg Haeubl, Linz (AT); Ernst Wressnegger, Linz (AT); Walter Raml, Hellmonsödt (AT)

(73) Assignee: DSM Fine Chemicals Austria NFG GmbH & CO KG, Linz (AT)

( * ) Notice: Subject to any disclaimer, the term of this patent is extended or adjusted under 35 U.S.C. 154(b) by 284 days.

(21) Appl. No.: 10/652,200

(22) Filed: Sep. 2, 2003

(65) Prior Publication Data

US 2004/0039086 A1    Feb. 26, 2004

(30) Foreign Application Priority Data

Mar. 9, 2002 (AT) .............................. A 1310/2002

(51) Int. Cl.
*C08F 6/00* (2006.01)
(52) U.S. Cl. ....................... 528/480; 504/345; 564/296
(58) Field of Classification Search ................ 504/345; 528/480; 564/296
See application file for complete search history.

(56) References Cited

U.S. PATENT DOCUMENTS 4,528,184 A    7/1985  Kurono et al.
5,925,379 A    7/1999  Mandeville, III et al.
6,096,834 A *  8/2000  Tremont ..................... 525/355

FOREIGN PATENT DOCUMENTS

EP    909 768 A2    4/1999
WO    02/22695 A1   6/2002

* cited by examiner

Primary Examiner—Terressa Boykin
(74) Attorney, Agent, or Firm—Wenderoth, Lind & Ponack, L.L.P

(57) ABSTRACT

Process for the preparation of alkylated N- or amino, ammonium or spirobicyclic ammonium group-containing, crosslinked polymer gels, which is characterized in that
a) in the crosslinkage step an aqueous solution of a polymer obtained by polymerization of the corresponding monomer is adjusted to a pH of 7.5–14 at a temperature of 0 to 90° C., then the appropriate crosslinking agent is metered in and precrosslinkage is carried out with stirring and the pre-crosslinked polymer is transferred for complete curing to a curing container, whereupon
  b) the cured crude gel is cut into a defined shape, then
  c) washed with methanol batchwise in a static or stirred bed and directly following this
  d) in methanol, the alkylation is carried out, after which the alkylated gel
  e) is first washed batchwise by means of methanol/NaCl washes in a static or stirred bed or continuously, then
  f) batchwise by means of NaCl washes and final water washes with deionized water in a static or stirred bed or continuously and also a process for the preparation of the alkylators used in sted d).

10 Claims, 1 Drawing Sheet

Continuously operated wash column

Figure 1:
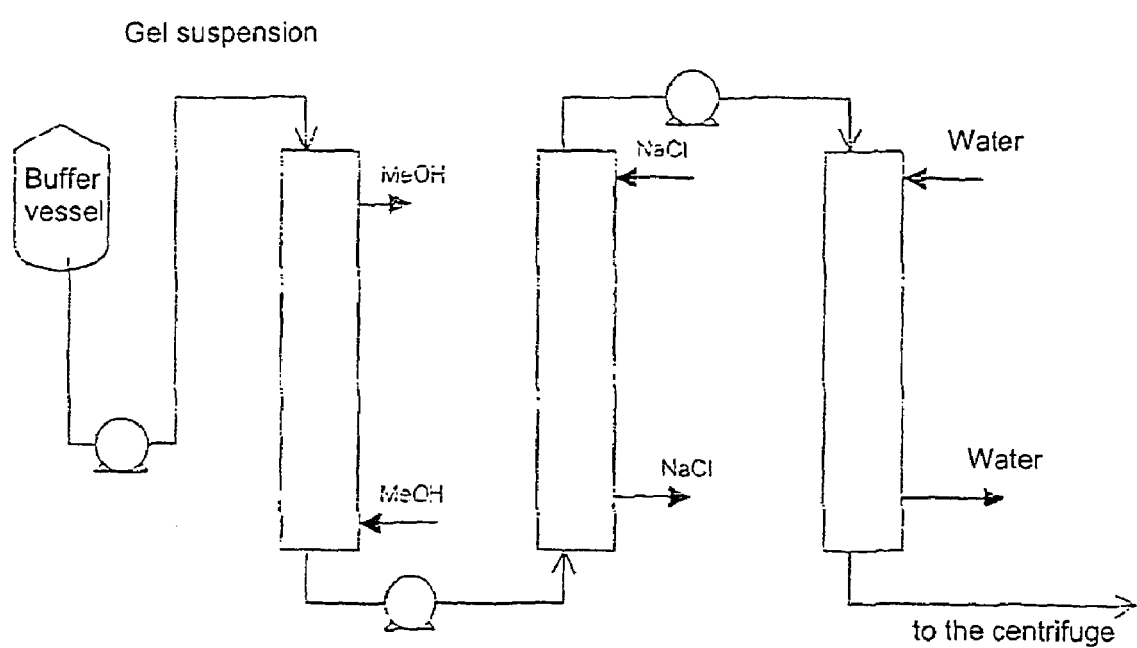

PREPARATION OF ALKYLATED N- OR AMINO, AMMONIUM OR SPIROBICYCLIC AMMONIUM GROUP-CONTAINING, CROSSLINKED POLYMERS

The invention relates to an industrial process for the preparation of alkylated N- or amino, ammonium or spirobicyclic or ammonium group-containing, crosslinked polymers, which are employed, for example, in medicine for lowering the cholesterol level by binding of the bile acids or of bile acid salts, such as, for example, colesevelam hydrochloride.

The preparation of these polymers is in this case carried out in a number of steps, such as crosslinkage, comminution, alkylation, washing with a number of washing steps between the individual stages and drying.

The processes for the preparation of alkylated crosslinked N- or amino, ammonium or spirobicyclic ammonium group-containing polymers known previously from the prior art, such as, for example, from WO 98/43653; WO 99/33452; WO 99/22721; U.S. Pat. No. 5,496,545; EP 0 909 768; WO 99/34786; WO 98/29107; WO 00/32656, WO 02/22695, Polymer Preprints 2000, 41 (1), 735 etc., for example by crosslinkage of polyallylamine hydrochloride with epichlorohydrin, and subsequent alkylation, for example with (6-bromohexyl)trimethylammonium bromide and 1-bromodecane, suffer from the fact of not being suitable for a production process on the industrial scale.

In the first process step, the crosslinkage, an uncontrolled curing in the reaction vessel leads to the formation of a polymer block, whereby damage to the equipment, for example to the stirrer, can occur. Additionally, there are high demands on an industrial gelling apparatus with respect to efficient batch intermediate cleaning.

The comminution of the cured crude gel takes place according to the prior art in a relatively uncontrolled manner, for example by stirring to dissolve the gel matter in a vessel. Since after this step particles of unequal size are present, homogeneity in the following chemical reactions and washing steps is not guaranteed, which leads to increased by-product formation and poorer washing efficiency.

One possibility for the preparation of particles having the desired mechanical properties, according to the prior art, is suspension polymerization, but for this process additional solvents are necessary.

The washing of crude gel serves mainly for the removal of the inorganic salts formed in the preceding step and is carried out according to the prior art by means of water and possibly subsequently using an alcohol, such as isopropanol or methanol. It turns out to be disadvantageous here that crude gels swell very strongly with water (5–40 fold) and thus large-volume and uneconomical process steps are concerned. Additionally, the very poor filtration efficiencies of these gels turn out to have a complicating effect. Since the water interferes in the subsequent step (alkylation) it is displaced in some processes with the aid of isopropanol. However, an additional solvent thus appears in the process, which, inter alia, is accompanied by the implementation of a separate solvent work-up.

The drying of the crude gel in the water-moist state is described according to the prior art as very troublesome with typical drying times of 1 week. The isopropanol-moist crude gel is easier to dry accepting the disadvantage already described of an additionally necessary solvent. In addition to the general disadvantage of a drying as a laborious process step, in the case of the drying of the crude gel its high oxidation sensitivity additionally comes to bear. In contrast to the alkylated final product, crude gel in fact contains unprotonated amino groups, which can form by-products with traces of oxygen.

The subsequent step is the alkylation, for example with bromodecane and (6-bromohexyl)trimethylammonium bromide. In the preparation of (6-bromohexyl)trimethyl-ammonium bromide, according to the prior art the yields of 78%, as described in Synth. Commun. (1999), 29 (14), 2393–2398, are low, the reaction times of 24 hours are very long and the solvents used, such as in this case tetrahydrofuran, which in a solvent work-up is very strongly prone to peroxide formation, are disadvantageous in terms of process technology and moreover expensive. Other preparation methods such as described in A. Gray et al., J. Am. Chem. Soc. 77, 3648 (1955) do have better crude yields, but have the disadvantage of the likewise long reaction time of one day, the high excess of dibromohexane needed (1.5 fold) and the use of benzene as a solvent, which is harmful both to man and to the environment. On account of the low quality of the crude product, it must moreover be recrystallized here from tert-butanol, which involves an additional outlay for a solvent work-up.

The alkylation is a heterogeneous reaction in which the particle size and also the particle size distribution of the crude gel employed play a large part. This fact is not taken into account in previous alkylation processes, so that during the diffusion-controlled reactions uncontrolled amounts of halogen-containing by-products, such as, for example, chlorodecane and/or chloroquat, and in the case of the use of methanol as a solvent in combination with aqueous sodium hydroxide, by-products such as methoxydecane and/or methoxyquat etc., result. A further disadvantage of hitherto customary alkylation processes is the unsatisfactory alkylation yields and long reaction times.

In the process according to the prior art, on account of the different particle sizes in some cases extremely long filtration times (e.g. 24 hours) also occur in the subsequent washing steps. Moreover, the considerable amounts of volatile organic impurities must then be eliminated from the polymers or gels by a number of alcohol/NaCl washes or alcohol washes.

Since the swelling behavior of the gels during the individual washing steps varies relatively greatly and the dry matter content of gels in general is very low (between 8–40%), the arrangement and the selection of the washing devices is of particular importance, in order on the one hand to keep the throughput high and in order on the other hand to keep the solvent consumption of the washing solutions low. A further point is the solvent preparation.

It was accordingly an object of the present invention to find a process for the preparation of alkylated N- or amino, ammonium or spirobicyclic ammonium group-containing, crosslinked gels or polymers, which is suitable for a production process on the industrial scale. The aim was in particular industrial processes for the preparation of crude gels (crosslinkage), their washing, drying and alkylation, preparation of quaternary haloalkylammonium salts, such as, for example, (6-bromohexyl)trimethylammonium bromide, and the consistent coordination of these processes with one another in order finally to arrive at a preparation process which is as simple and efficient as possible guaranteeing the quality requirements (formation of by-products which is as low as possible) and high yield.

Unexpectedly, it was possible to achieve this object by means of a preparation process in which not only optimal individual steps for the crosslinkage, crude gel comminution, gel washing, preparation of alkylation reagents and alkylation were found, but also at the same time an entire step and a solvent could be completely eliminated.

The invention therefore relates to a process for the preparation of alkylated N- or amino, ammonium or spirobicyclic or ammonium group-containing, crosslinked polymer gels, wherein a) in the crosslinkage step an aqueous solution of a polymer obtained by polymerization of the corresponding monomer is adjusted to a pH of 7.5–14 at a temperature of 0 to 90° C., then the appropriate crosslinking agent is metered in and precrosslinkage is carried out with stirring and the precrosslinked polymer is transferred for complete curing to a curing container, whereupon b) the cured crude gel is cut into a defined shape, then c) washed with methanol batchwise in a static or stirred bed and directly following this d) in methanol, the alkylation is carried out by addition of one or more alkylators at a temperature from 5 to 90° C. and a pressure from 1 to 3 bar, addition of a base and optionally reprotonation, after which the alkylated gel e) is first washed batchwise by means of methanol/NaCl washes in a static or stirred bed or continuously and then f) batchwise by means of NaCl washes and final water washes with deionized water in a static or stirred bed or continuously.

In the process according to the invention, alkylated, crosslinked, N- or amino, ammonium or spirobicyclic ammonium group-containing polymers are prepared.

These polymers are polymers which are described, for example, in WO 0/32656, WO 00/38664, WO 99/33452; WO 99/22721; WO 98/43653, WO 02/22696, U.S. Pat. No. 5,624,963 and U.S. Pat. No. 5,496,545, and in Polymer Preprints 2000, 41 (1), 735. Cationic polymers, in particular, are suitable for the process according to the invention. The cationic polymers include, inter alia, those polymers which contain an amine N atom, such as, for example, primary, secondary or tertiary amine groups or salts thereof, quaternary ammonium groups and/or spirobicyclic ammonium groups. Additional cationic groups comprise amidino, guanidino, imino etc. The cationic polymer is distinguished in that it has a positive charge at physiological pH.

Examples of suitable cationic polymers comprise polyvinylamines, polyallylamines, polydiallylamines, polyvinylimidazoles, polydiallylalkylamines, polyethyleneimines etc., and polymers comprising the repeating units known from, for example, WO 00/32656, page 7f.; WO 98/43653, page 4f.; U.S. Pat. No. 5,496,545, column 2 to 4; U.S. Pat. No. 5,624,963; WO 98/29107 etc.

The polymers employed for the process according to the invention further have negatively charged counterions. These counterions can be organic or inorganic ions or combinations thereof. Suitable counterions likewise comprise the counterions known from the prior art already cited. Examples of suitable inorganic ions are halides, in particular chloride, phosphates, phosphites, carbonates, bicarbonates, sulfates, bisulfates, hydroxides, nitrates, persulfates, sulfites and sulfides. Examples of suitable organic ions are acetates, ascorbates, benzoates, lactate, fumarate, maleate, pyruvate, citrates, dihydrogencitrates, hydrogencitrates, propionate, butyrate, oxalates, succinates, tartrates, cholates etc.

In the first process step according to the invention, the polymers, which can be obtained by polymerization of the corresponding monomers according to the prior art, are crosslinked.

Suitable crosslinking agents comprise the crosslinking agents known from the references already cited. Examples of these are epichlorohydrin, succinyl dichloride, ethylenediamine, toluene diisocyanate, diacrylates, dimethacrylates, methylenebisacrylamides, dichloroethane, dichloropropane, etc.

Preferably, the crosslinkage is divided up in 2 reactors, whereby the problems occurring according to the prior art, such as uncontrolled curing in the reaction vessel, are avoided. In a suitable mixing reactor, preferably having a highly polished stainless steel surface with installed CIP nozzles (CIP=clean in place), an aqueous solution of the appropriate polymer, such as, for example, a 50% strength polyallylamine hydrochloride solution is mixed according to the invention with water and sodium hydroxide solution, preferably 30% strength to 60% strength. A pH of 7.5–14 is adjusted here. A pH of 9.5–10.6 is preferred and of 9.8 to 10.4 is particularly preferred. The mixing temperature is 0 to 90° C., preferably 5–30° C. and particularly preferably 10–15° C.

This reaction mixture is then preferably transferred to a suitable gelling reactor and the appropriate crosslinking agent such as, for example, epichlorohydrin, is charged for the crosslinkage. For the precrosslinkage, the reaction mixture is stirred for 1 to 240 minutes, preferably 10 to 120 minutes and particularly preferably 15 to 30 minutes. Excessively short stirring leads to a two-phase reaction mixture and as a result to an inhomogeneous product, while excessively long stirring leads to uncontrolled curing in the gelling vessel.

The precrosslinked mixture is then filled into suitable curing containers and cured by allowing to stand according to the prior art.

The gelling reactor and the pipelines coming into contact with precrosslinked gel are cleaned according to the invention with water. For the purposes of efficient cleaning, the gelling reactor preferably has a highly polished stainless steel surface and CIP nozzles.

In step b), the cured crude gel is cut into a defined shape. The comminution of the crude gel into a defined shape, preferably into cubes having an edge length of 1 to 3 mm, and having defined particle size distribution is preferably carried out according to Austrian patent application A 1630/2001.

By comminution into a defined shape, according to the invention the homogeneity necessary for the following reaction steps and washing steps is guaranteed.

In step c), the cut crude gel is washed batchwise according to the invention exclusively with methanol in a static or in a stirred bed. The step is carried out here at a temperature from 1° C. to 65° C., preferably at 5 to 60° C., particularly preferably at 10 to 40° C.

The crude gel washing (step c) is carried out according to the invention after the cutting of the block gel on the basis of the compressibility of the gel, preferably in a stirring vessel or in a stirred suction filter, where particularly preferably the solvent supply takes place from the bottom of the stirring vessel or of the stirred suction filter and the aspiration of the used wash medium takes place via a dip tube until a certain threshold value of water is reached. If needed, stirring can also be carried out in the case of feeding in at the bottom.

The supply of the solvent, however, can also take place via the top in the stirring vessel or in the stirred suction filter.

According to the invention, the crude gel washing takes place with precisely the solvent, namely with methanol, in which the alkylation is also carried out.

Unexpectedly, still further advantages are achieved by washing with exclusively methanol compared with the prior art (for example Polymer Preprints 2000, 41 (1), page 735–736):

By washing according to the invention with methanol instead of with water and subsequently with isopropanol, the strong swelling of the crude gel in the water is avoided. Further, large-volume and uneconomical process steps which are necessary when using water, and poor filtration efficiencies of the gels swollen in water, are avoided.

By the elimination of isopropanol from the process, the solvent work-up otherwise necessary for isopropanol is not applicable. In contrast to the simple distillation of methanol, the work-up of isopropanol can, in process technology terms, only be carried out with very great difficulty and laboriously. For this, a membrane process or an extractive distillation is in fact necessary.

An additional solvent work-up is not necessary in comparison with the prior art, since methanol is in turn already present in the subsequent step of the alkylation.

By means of the washing according to the invention, the washing efficiency is increased by saving the amount of the washing solution totally necessary compared with the abovementioned prior art.

Further, in the washing by aspiration of the supernatant washing liquid by means of a dip tube from the washing vessel, in contrast to the use of conventional filtration apparatuses, such as centrifuges or suction filters, equipment and batch time are saved.

According to the prior art, the drying of the crude gel takes place following the washing.

According to the invention, in connection with the use of the same solvent described above, and in the case of the crude gel washing and in the alkylation, a drying of the crude gel is superfluous. Considerable savings of equipment, handling and batch time in turn result thereby.

In the next step, the alkylation of the crude gel takes place (step d).

When carrying out the industrial alkylation reaction, the use of gel having the appropriate mechanical properties, defined particle size and narrow particle size distribution, is crucial. Further, the process must be designed such that these properties are not lost in any step. For this, it is necessary to spare the gel from mechanical stress as much as possible, for example by drastic reduction of stirring times. Unexpectedly, only very short necessary stirring times in the minute range were determined in the industrial plants in certain operations. It was found that a short compulsory mixing by means of a stirrer, during and after introduction of raw materials and reagents is always necessary, but then convection mixing by means of reflux boiling suffices.

In the alkylation according to the invention, the appropriate alkylators are added to the gel suspension stirred in methanol.

Alkylators are understood as meaning reactants which, if they are reacted with a crosslinked polymer, cause an alkyl group or a derivative thereof, such as, for example, a substituted alkyl group etc., to be covalently bonded to one or more of the N atoms in the polymer.

Suitable alkylators are in this case compounds of the formula RX, which have an alkyl group or an alkyl derivative having 1 to 24 C atoms (R), which is bonded to a leaving group (X), as are already known from the prior arts already cited.

R is accordingly a linear, branched or cyclic alkyl radical having 1 to 24 C atoms, preferably having 4 to 20 C atoms, or an alkyl derivative, such as, for example, a $C_1$–$C_{20}$-, preferably $C_4$–$C_{20}$-hydroxyalkyl group, $C_7$–$C_{20}$-aralkyl group, $C_1$–$C_{20}$-, preferably $C_4$–$C_{20}$-alkylammonium group or $C_1$–$C_{20}$-, preferably $C_4$–$C_{20}$-alkylamido group.

X is an electrophilic leaving group, for example from the group consisting of the halides, such as, for example, chloride, bromide, fluoride, iodide or, for example, a leaving group such as epoxy, tosylate, mesylate or triflate. The alkylator can in this case contain one or more leaving groups.

Examples of preferred alkylators are $C_1$–$C_{24}$-alkyl halides, such as, for example, n-butyl halides, n-hexyl halide, n-decyl halide, n-dodecyl halide, n-tetradecyl halide, n-octadecyl halide, etc., $C_1$–$C_{24}$-dihaloalkanes, such as, for example, 1,10-dihalodecane, etc., $C_1$–$C_{24}$-hydroxyalkyl halides, such as, for example, 11-halo-1-undecanol, etc., $C_1$–$C_{24}$-aralkyl halides, such as, for example, benzyl halide, substituted benzyl halides, etc., $C_1$–$C_{24}$-alkylepoxyammonium salts, such as, for example, glycidylpropyltrimethylammonium salt, etc., $C_1$–$C_{24}$-epoxyalkylamides, such as, for example, N-(2,3-epoxypropane)butyramide, N-(2,3-epoxypropane)hexanamide, etc., $C_1$–$C_{24}$-haloalkylammonium salts, such as, for example, (4-halobutyl)trimethylammonium salt, (6-halohexyl)trimethylammonium salt, (8-halooctyl)trimethylammonium salt, (10-halodecyl)trimethylammonium salt, (12-halododecyl)trimethylammonium salt, etc. Preferred alkylators are bromodecane and 6-bromohexyltrimethylammonium bromide.

For the preparation of 6-bromohexyltrimethylammonium bromide, a large number of processes are already described in the literature, which, however, all have various disadvantages, such as low yields, poor quality and/or long reaction times.

Unexpectedly, a process for the preparation of quaternary haloalkylammonium salts, such as, for example, 6-bromohexyltrimethylammonium bromide has now been found which produces quaternary haloalkylammonium salts in higher space-time yields, with higher quality avoiding by-product formation.

The invention accordingly also relates to a process for the preparation of quaternary haloalkylammonium salts, which is characterized in that trimethylamine and a dihalo-$C_3$–$C_{24}$-alkane are reacted in ethyl acetate at a temperature from –15° C. to +100° C. and at a pressure from 1 to 10 bar, whereupon the reaction mixture is cooled and filtered after 5 to 15 hours and the quaternary heteroalkylammonium salt thus obtained is dried.

In the process according to the invention, a dihalo-$C_3$–$C_{24}$-alkane is reacted with trimethylamine.

Suitable dihalo-$C_3$–$C_{24}$-alkanes are, for example, 1,3-dibromopropane, 1,4-dibromobutane, 1,5-dibromopentane, 1,6-dibromohexane etc. Preferably, 1,6-dibromohexane is employed.

According to the invention, the reaction is carried out in ethyl acetate as a solvent. It is possible here to meter trimethylamine into the appropriate dihalo-$C_3$–$C_{24}$-alkane in ethyl acetate or alternatively conversely the appropriate dihalo-$C_3$–$C_{24}$-alkane into trimethylamine in ethyl acetate. The dihalo-$C_3$–$C_{24}$-alkane is employed in a small excess based on trimethylamine. A molar ratio of trimethyl amine to dihalo-$C_3$–$C_{24}$-alkane of 1:1.01 to 1:1.10 is preferred.

The reaction temperature is –15° C. to +100° C., preferably 15 to 70° C. and particularly preferably 30 to 65° C. The temperature can also be increased here stepwise by means of a temperature ramp.

The reaction is carried out at a pressure of 1 to 10 bar.

After approximately 5 to 15 hours, the reaction mixture is cooled and filtered. The crystallizate obtained is washed with ethyl acetate and dried.

By means of the process according to the invention, haloalkylammonium salts, such as, for example, 6-bromohexyltrimethylammonium bromide are obtained in yields of 95 to 98% and in a purity of up to 100% and can thus be employed directly as alkylating agents without further work-up.

Preferably, for the alkylation according to the invention, 6-bromohexyltrimethylammonium bromide is preferably employed which has been prepared by the above process.

In the alkylation reaction, one or more alkylators can be added.

The alkylators are employed in the process according to the invention depending on the desired degree of alkylation. The synthesis of colesevelam hydrochloride should, for example, yield a polymer structure in which approximately 12% of the amines of the polyallylamine structure are crosslinked, approximately 40% of the amines of the polyallylamine structure are provided with decyl groups and approximately 34% of the amines of the polyallylamine structure are provided with trimethylammoniumhexyl groups, and approximately 14% of the amines of the polyallylamine structure are retained as primary amines (Polymer Preprints 2000, 41 (1), 735–736). The different degrees of alkylation can be determined very simply in comparison to a selected reference substance by analysis of the C/N ratio and the number of the free amines (titratable amines).

The addition of the alkylators is carried out at a temperature between 5 and 90° C. and at a pressure of 1–3 bar.

Before or after the addition, the gel suspended in methanol can, for example, be heated to 25 to 90° C., preferably to 35 to 65° C. and particularly preferably to the boiling temperature of methanol.

Preferably, the stirrer of the alkylating vessel is only switched on periodically (e.g. every 30 min) during the heating phase to spare the gel and in each case only for a short time (e.g. 2–3 min).

After addition of the alkylator(s), the reaction mixture is additionally mixed, the mixing time being between 1 and 60 minutes, preferably 5 to 50 minutes and particularly preferably 10 to 40 minutes.

The addition of the base is then begun. A suitable base for this, depending on the solvent used, is NaOH, KOH, $NH_4OH$, LiOH, $Ca(OH)_2$, $Ba(OH)_2$, NaH and $NaNH_2$. NaOH is preferably employed.

The addition of the base is preferably carried out in a number of portions.

Preferably, to spare the gel, the stirrer of the alkylating vessel is only switched on during the charging of the base and for a short time afterwards (e.g. 10 minutes). In particular, it has been found that the convective mixing suffices completely on account of the reflux boiling during possibly longer after-reaction times (typically 8–10 hours).

The alkylation reaction is complete when at least 95 to 99% of the alkylators have reacted, which according to the invention takes place approximately 30% more rapidly in comparison with the prior art.

After the end of the reaction, the gel is reprotonated in methanol by addition of an acid.

Preferably, to spare the gel the stirrer of the alkylating vessel is only switched on during the charging of the acid and for a short time afterwards (e.g. 10 minutes).

Suitable acids for the reprotonation are all mineral acids and organic acids which lead to the counterions already mentioned.

These are, for example, HCl, HBr, $H_2SO_4$, $H_3PO_4$, $HNO_3$ etc. and formic acid, acetic acid, oxalic acid, citric acid, pyruvic acid, maleic acid, fumaric acid, propionic acid, tartaric acid etc.

If desired, the reprotonation of the alkylated gel, however, can also be carried out at the end of one or more methanol and/or methanol/salt, for example NaCl, washes.

The methanol/NaCl washes in step e) can be carried out according to the invention after the alkylation, as described for the crude gel wash. Particularly preferably, the washing is carried out in a washing tower or a stirring vessel, the gel beads being present in the static or stirred bed after filtration of the gel suspension and the methanol/NaCl solution being carried out from the bottom and the aspiration via a dip tube until a certain threshold value of organic by-products is reached. As soon as this is reached, if needed the gel cake can be filtered to dryness. Optionally, the gel cake can be washed in a continuously operated wash column (FIG. 1).

In order subsequently to replace the bromide ions of the quaternary ammonium groups with chloride ions, washing with a sodium chloride solution (step f) is carried out according to the invention after the methanol/NaCl wash. Particularly preferably, a sodium chloride solution is used which has a lower concentration than 2 molar (0.1–1.9 molar) in order, on account of the density difference between the gel particles filled with organic solvent and the sodium chloride solution, to cause no deposition. If needed, a sodium chloride solution of higher concentration (up to concentrated sodium chloride solution) can also be used in order specifically to control deposition of the gel particles and thereby a washing in countercurrent in a column. The application of the sodium chloride solution to the gel bed is preferably carried out by spraying, since in this case despite a considerable shrinkage and as a result crack formation in the gel bed an efficient washing is guaranteed. The forcing of the washing solution onto the gel cake can likewise be carried out, but more washing solution is needed.

The water washing is preferably carried out in an analogous manner to the sodium chloride washing by spraying. In the case of the water wash, however, the entire wash medium can be applied to the gel bed and forced through the gel cake.

The sodium chloride and water washing can, however, also be carried out by a suspension wash in a stirred suction filter or in a stirring vessel. The last washing step is then preferably carried out on a suction filter, a belt filter or a centrifuge.

Optionally, the NaCl and water washing can be carried out continuously by use of columns connected in series (FIG. 1).

By means of the process according to the invention, which [lacuna] of the steps according to the invention crosslinkage in two separate reaction vessels with maintenance of a specific pH and a specific temperature, cutting of the gel into a defined form, washing with alcohol with aspiration of the supernatant washing solution by means of a dip tube and alkylation, the disadvantages of the processes known hitherto from the prior art are avoided. A particular advantage is the omission of a drying step necessary according to the prior art before the alkylation step.

The preparation of the alkylators according to the invention, such as, for example, (6-bromohexyl)trimethylammonium bromide, is moreover distinguished in that the quaternary haloalkylammonium salts are obtained in a shorter reaction time in significantly higher yields of 95 to 98% with significantly higher purities of up to 100% in comparison with the prior art and in that these can be employed directly for the alkylation step without further work-up.

By means of the gel washing according to the invention, taking into account the physicochemical properties of the gel, in comparison with the prior art (Polymer Preprints 2000, 41 (1), 735) a washing process has moreover been found in which the solvent consumption and the mixing of the solvents used is minimal and the throughput per volume unit can be kept high. The result is that the amount of washing solvent to be used can be reduced by up to 66% and the throughput can be doubled. The gel washing process is accordingly likewise a subject of the present invention.

A further advantage of the overall process according to the invention is the higher total throughput due to reduction of the reaction time by about 30% (from about 20 h, or 26 h according to the prior art, to 14–16 h).

EXAMPLE 1

Industrial Preparation of a Polyallylamine Hydrochloride Crosslinked with Epichlorohydrin, Alkylation and Washing:

a) Crosslinkage:

In the mixing vessel R1, 320.2 kg of completely deionized water and 236.0 kg of 50% strength polyallylamine hydrochloride solution were introduced with stirring. A pH of between 9.8–10.4 was then adjusted using sodium hydroxide solution (50% strength). The mixture obtained was stirred at 20° C. for 20 minutes, cooled to 13° C. and then transferred to the gelling reactor R2. 2.36 kg of epichlorohydrin were charged there with stirring and stirring was continued for 20 minutes for homogenization. For curing, the contents of R2 were filled into a drum. The curing time was 18 hours. The gelling reactor was rinsed with 50 kg of completely deionized water in order to avoid undesired curing of gel residues in the reactor. The yield was 625 kg of crude gel (100%).

b) Cutting and c) Washing of the Cured Crude Gel:

1400 kg of a cured crude gel were cut in the clean room by means of a gel cutting apparatus in the reactor R3 (cubes having an edge length of about 2×2×2 mm). For suspension, 2920 kg of methanol were charged, the gel was stirred for 20 minutes and the suspension was transferred to the wash vessel R4. The wash mother liquor was forced out via a dip tube. A total of 3 washings with methanol were carried out.

d) Alkylation:

The washed methanol-moist crude gel was suspended in 1200 kg of methanol in the reactor R4 and transferred to the alkylation vessel R5. A solution of 376 kg of (6-bromohexyl)trimethylammonium bromide in 220 kg of methanol, and 260 kg of 1-bromodecane were charged to this stirred suspension. The reaction mixture in R5 was heated to 60° C., where for mixing with the best possible mechanical sparing of the gel particles the stirrer was only switched on for 2–3 minutes every 30 minutes. 53 kg of a sodium hydroxide solution (50%) were added with stirring at 60–70° C. and the mixture was then additionally stirred for a further 10 minutes before the reaction mixture was left under reflux boiling for 2 hours. A total of 4 portions of sodium hydroxide solution were charged in this manner. The after-reaction took place during the following 8-hour reflux boiling at 60–70° C. with the stirrer switched off.

Reprotonation:

The contents of R5 were cooled to 40° C. with stirring, 240 kg of concentrated hydrochloric acid (34% strength) were charged and the stirrer was switched off after a further 10 minutes.

Washing of the Alkylated Gel:

The gel suspension obtained was transferred to the wash reactor R6 and treated 4 times with stirring with 1680 kg each of methanol and 255 kg of NaCl solution (10.9%) and filtered off via a dip tube after a stirring time of 20 minutes. The gel cake was then washed 6 times using 1800–3000 kg each of NaCl solution (10.9%) and 6 times using 1800–3000 kg each of completely deionized water on a pressure suction filter (F1).

Drying:

The moist gel was dried according to the prior art up to a drying loss of at most 3%. 1750 kg (100%) of product having a dry matter content of at most 4% were obtained.

Solvent Regeneration:

The distillation of the methanol was carried out in two stages. The first stage in the column K1 was a predistillation with an acidically adjusted feed for the removal of volatile basic amines (allylamine). In the receiver B1, the basic methanolich filtrates from the wash vessel R4 were mixed with the acidic filtrates from R5 and, and before placing in K1, adjusted to a pH of <2 by means of sulfuric acid. The predistillate consisted of a mixture of methanol/water. This was separated in the second stage using the column K2.

A comparison example for the preparation of colesevelam is found according to the prior art in the reference Polymer Preprints 2000, 41 (1), pages 735–736.

EXAMPLE 2

Step C) Crude Gel Washes

Comparison experiment according to the prior art (see also procedure in *Polymer Preprints* 2000, 41 (1), 735): In order to prepare 677 g of dried and washed crude gel, 10 liters of water were added for the purpose of suspension preparation to the comminuted gel of 5300 g (which corresponds to about 4300 g of crude gel in accordance with the process according to the invention). The gel was then washed 3 times by means of suspension washes with 10, 15 and 20 liters of water, in each case being stirred for 1 hour. It was then washed with 17 l of isopropanol and the gel was dried on a suction filter after filtration. The yield was 680 g.

Crude Gel Washes in Accordance with the Process According to the Invention:

a): 4300 g of the cut crude gel were washed 3 times with 8600 g each of methanol via suspension washes. The gel was then dried, 662 g of light yellowish granules being obtained.

b): 4300 g of the cut crude gel were washed 3 times with 8600 g each of methanol via suspension washes. After filtration, the filter cake of 4268 g obtained was used directly for the next reaction step (alkylation).

c): 4300 g of the cut crude gel were washed with 27,000 g of methanol such that the amount of methanol was pumped through the gel suspension with stirring from the bottom of the stirred vessel. The supernatant solution was aspirated by means of a dip tube. The gel suspension of 6380 g obtained was used directly for a next reaction step (alkylation).

TABLE 1

| Comparison of the wash amounts used with identical wash efficiency: | |
|---|---|
| Prior art | 45 kg of water; 17 l of isopropanol |
| a) | 25.8 kg of methanol |
| b) | 25.8 kg of methanol |
| c) | 27 kg of methanol |

EXAMPLE 3

Step e) Methanol/NaCl Washes

Comparison Example

Prior art (see also procedure in *Polymer Preprints* 2000; 41 (1), 735):

In order to prepare 727 g of dried colesevelam hydrochloride, the reprotonated gel was washed with 15.92 kg of methanol via suspension or displacement washes.

Methanol/NaCl washes in accordance with the process according to the invention:

a): Based on the batch having a size of 1900 g of crude gel (corresponds to about 730 g of dried colesevelam hydrochloride), 3 suspension washes using 5 kg each (in total 15 kg) of methanol were carried out.

b): Based on the batch having a size of 1900 g of crude gel (corresponds to about 730 g of dried colesevelam hydrochloride), 3 suspension washes using 4.4 kg each (in total 13.2 kg) of methanol/NaCl (87/13% by weight=90/10% by vol.; 2M NaCl solution) were carried out.

c): Based on the batch having a size of 1900 g of crude gel (corresponds to about 730 g of dried colesevelam hydrochloride), 5 suspension washes using 2.1 kg each (in total 10.5 kg) of methanol/NaCl (87/13% by weight=90/10% by vol.; 2M NaCl solution) were carried out such that after allowing the gel suspension to settle excess methanol was aspirated above the gel cake by means of a dip tube.

d): Based on the batch having a size of 1900 g of crude gel (corresponds to about 730 g of dried colesevelam hydrochloride), the gel from the bottom was washed such that in total only 5.3 kg of methanol/NaCl (87/13% by weight=90/10% by vol.) were used in order to prepare a product complying with the specification.

TABLE 2

| Comparison of the wash amounts used with identical wash efficiency: | |
| --- | --- |
| Prior art | 15.9 kg of methanol |
| a) | 15.0 kg of methanol/NaCl |
| b) | 13.2 kg of methanol/NaCl |
| c) | 10.5 kg of methanol/NaCl |
| d) | 5.3 kg of methanol/NaCl |

EXAMPLE 4

Step f) NaCl Washes

Prior art (see also procedure in *Polymer Preprints* 2000; 41 (1), 735):

In order to prepare 727 g of dried colesevelam hydrochloride, the reprotonated gel was washed with 43.2 kg of 2M aqueous NaCl solution via suspension or displacement washes after MeOH or MeOH/NaCl washes with 43.2 kg of 2M aqueous NaCl solution had taken place.

a): Based on the batch having a size of 1900 g of crude gel (corresponds to about 730 g of dried colesevelam hydrochloride), 6 washes using 5.3 kg each (in total 32 kg) of 2M aqueous NaCl solution were carried out, the gel being filtered off completely after each washing step.

b): Based on the batch having a size of 1900 g of crude gel (corresponds to about 730 g of dried colesevelam hydrochloride), the gel was washed by spraying with aqueous 2M NaCl solution such that in total only 20.5 kg of solvent were used in order to prepare a product complying with the specification.

TABLE 3

| Comparison of the wash amounts used with identical wash efficiency: | |
| --- | --- |
| Prior art | 43.2 kg of 2 M NaCl solution |
| a) | 32.0 kg of 2 M NaCl solution |
| b) | 20.5 kg of 2 M NaCl solution |

EXAMPLE 5

Water Washes

Prior art (see also procedure in *Polymer Preprints* 2000; 41 (1), 735): In order to prepare 727 g of dried colesevelam hydrochloride, the reprotonated gel was washed with 44 kg of deionized water via suspension or displacement washes after MeOH and NaCl washes had been carried out.

a): Based on the batch having a size of 1900 g of crude gel (corresponds to about 730 g of dried colesevelam hydrochloride), 6 washes using 4.97 kg each (in total 29.8 kg) of deionized water were carried out, the gel being filtered off completely after each washing step.

b): Based on the batch having a size of 1900 g of crude gel (corresponds to about 730 g of dried colesevelam hydrochloride), the gel was washed by spraying or applying with deionized water such that in total only 13.2 kg of solvent were used in order to prepare a product complying with the specification.

TABLE 4

| Comparison of the wash amounts used—It was the object to achieve the same wash efficiency: | |
| --- | --- |
| Prior art | 44.0 kg of deionized water |
| a) | 29.8 kg of deionized water |
| b) | 13.2 kg of deionized water |

EXAMPLE 6

Preparation of (6-bromohexyl)trimethylammonium bromide 494 kg (5606 mol) of ethyl acetate and 244 kg (1000 mol) of 1,6-dibromohexane were charged into a reactor with stirring and simultaneous heating to 60° C. 64 kg (1080 mol) of trimethylamine were metered in at 1 bar in the course of 3 hours. After an after-reaction time of a further 3 h, the reaction mixture was cooled and filtered through a suction filter and the crystallizate obtained was washed with ethyl acetate. After drying had taken place, 288 kg (95.1%) of (6-bromohexyl)trimethylammonium bromide of 99.8% purity were obtained.

EXAMPLE 7

Preparation of (I) by Means of a Temperature Ramp & Converse Charging Sequence 314 kg of ethyl acetate, 29 kg of trimethylamine and 108.5 kg of 1,6-dibromohexane were charged into a reactor at 11°

C. The mixture was heated to 40° C. in the course of 2–3 hours. After a reaction time of a further 6–7 h, the reaction mixture was again heated to 60° C. in the course of 2–3 hours and then cooled and filtered through a suction filter. The crystallizate obtained was washed with ethyl acetate. After drying on the suction filter had taken place, 130.0 kg (96.5%) of (6-bromohexyl)trimethylammonium bromide of 100% purity were obtained.

EXAMPLE 8

Reduced Temperature Program (Reduced Heating Times)

3390 kg of ethyl acetate, 452 kg of trimethylamine and 1673 kg of 1,6-dibromohexane were charged into a reactor at 15° C. The mixture was heated to 40° C. in the course of 0.5 hour. After a reaction time of a further 7 h, the reaction mixture was again heated to 60° C. in the course of 0.5–1 hour and then cooled and filtered through a belt filter. The crystallizate obtained was washed with ethyl acetate. After drying had taken place, 2028 kg (97.6%) of (6-bromohexyl)trimethylammonium bromide of 99.8% purity were obtained.

The invention claimed is:

1. A process for the preparation of alkylated N- or amino, ammonium or spirobicyclic or ammonium group-containing, crosslinked polymer gels, wherein
   a) in the crosslinkage step an aqueous solution of a polymer provided by polymerization of the corresponding monomer is adjusted to a pH of 7.5–14 at a temperature of 0 to 90° C., then the appropriate crosslinking agent is metered in and precrosslinkage is carried out with stirring and the precrosslinked polymer is transferred for complete curing to a curing container, whereupon
   b) the cured crude gel is cut into a defined shape, then
   c) washed with methanol batchwise in a static or stirred bed and directly following this
   d) in methanol, the alkylation is carried out by addition of one or more alkylators at a temperature from 5 to 90° C. and a pressure from 1 to 3 bar, addition of a base and optionally reprotonation, after which the alkylated gel
   e) is first washed batchwise by means of methanol/NaCl washes in a static or stirred bed or continuously, then
   f) batchwise by means of NaCl washes and final water washes with deionized water in a static or stirred bed or continuously.

2. The process as claimed in claim 1, wherein in the crosslinkage in step a) the aqueous polymer solution is first adjusted to a pH of 9.5 to 10.6 in a mixing reactor at a temperature from 5 to 30° C., and then this reaction mixture is transferred to a gelling reactor and a crosslinking agent is added, whereupon the reaction mixture is precrosslinked for 10 to 120 minutes with stirring and then transfer red to a curing container for complete curing.

3. The process as claimed in claim 1, wherein in the alkylation in step d) in each case the mixture is stirred only during and shortly after introduction of the reagents.

4. The process as claimed in claim 1, wherein the crude gel washes in step c) and/or the methanol/sodium chloride washes in step e) are carried out in a stirring vessel or in a stirred suction filter, the solvent supply taking place from the bottom of the stirring vessel or the stirred suction filter or via the top in the stirring vessel or in the stirred suction filter and the aspiration of the used wash medium taking place via a dip tube.

5. The process as claimed in claim 1, wherein the methanol/sodium chloride washes in step e) are carried out in a continuously operated wash column or in a wash tower or in a stirring vessel, the gel cake being present after filtration of the gel suspension as a static or stirred bed and the supply of methanol/sodium chloride solution taking place from the bottom and the aspiration taking place via a dip tube.

6. The process as claimed in claim 1, wherein the sodium chloride washes and/or the water washes in step f) are carried out by spraying the gel bed with the washing solution or by suspension washes in a stirred suction filter or in a stirring vessel or in a continuously operated wash column.

7. The process as claimed in claim 1, wherein in the alkylation in step d) haloalkylammonium salts are employed as alkylators, optionally in combination with bromodecane.

8. The process as claimed in claim 7, wherein in step d) haloalkylammonium salts, prepared by reaction of trimethylamine and a dihalo-$C_3$–$C_{24}$-alkane in ethyl acetate at a temperature from −15 to 100° C. and at a pressure from 1 to 10 bar, subsequent cooling, filtration and drying, are employed as an alkylator, optionally in combination with bromodecane.

9. The process as claimed in claim 1, wherein for the alkylation in step d) the alkylator employed is 6-bromohexyltrimethylammonium bromide, prepared by reacting trimethylamine and 1,6-dibromohexane in ethyl acetate at a temperature from −15 to 100° C. and at a pressure from 1 to 10 bar, whereupon the reaction mixture is cooled after 5 to 15 hours and filtered and the haloalkylammonium salt thus obtained is dried, and said alkylator employed optionally in combination with bromodecane.

10. A process for the preparation of alkylated N- or amino, ammonium or spirobicyclic or ammonium group-containing, crosslinked polymer gels, which comprises washing a gelled and cut crude gel provided by polymerization and crosslinkage
   a) in a stirring vessel or in a stirred suction filter with methanol, the solvent supply taking place from the bottom of the stirring vessel or the stirred suction filter or via the top in the stirring vessel or in the stirred suction filter and the aspiration of the used wash medium taking place via a dip tube and
   b) the crude gel washed in this way being alkylated with an alkylator following this, whereupon
   c) a methanol/sodium chloride wash is carried out in a continuously operated wash column or in a wash tower or stirring vessel, the gel cake being present after filtration of the gel suspension as a static or stirred bed and the supply of methanol/sodium chloride solution taking place from the bottom and the aspiration taking place via a dip tube, and then
   d) a sodium chloride wash and a water wash is carried out by spraying the gel bed with the washing solution or by suspension washes in a stirred suction filter or in a stirring vessel or in a continuously operated wash column.

* * * * *